(12) United States Patent
Schaerer (10) Patent No.: US 8,146,465 B2
(45) Date of Patent: Apr. 3, 2012

(54) INSTALLATION FOR SEQUENTIAL LOADING OF BARS OF MATERIAL INTO A MACHINING CENTER

(75) Inventor: Rolf Schaerer, Orvin (CH)

(73) Assignee: LNS S.A., Orvin (CH)

( * ) Notice: Subject to any disclaimer, the term of this patent is extended or adjusted under 35 U.S.C. 154(b) by 529 days.

(21) Appl. No.: 12/298,234

(22) PCT Filed: Apr. 16, 2007

(86) PCT No.: PCT/EP2007/053686
§ 371 (c)(1),
(2), (4) Date: Feb. 3, 2009

(87) PCT Pub. No.: WO2007/125032
PCT Pub. Date: Nov. 8, 2007

(65) Prior Publication Data
US 2009/0211413 A1    Aug. 27, 2009

(30) Foreign Application Priority Data
Apr. 27, 2006 (EP) .................................... 06113214

(51) Int. Cl.
*B23B 13/00* (2006.01)
(52) U.S. Cl. ............... 82/124; 82/125; 414/15
(58) Field of Classification Search ............ 82/124, 82/125, 126, 127; 198/481.1, 483.1; 414/22.66; 83/423
See application file for complete search history.

(56) References Cited

U.S. PATENT DOCUMENTS

| | | | | |
|---|---|---|---|---|
| 138,789 A * | 5/1873 | Church | ............ | 144/30 |
| 611,364 A * | 9/1898 | Holden | ............ | 198/413 |
| 1,824,414 A * | 9/1931 | Stein | ............ | 198/456 |
| 3,067,644 A * | 12/1962 | Dearsley | ............ | 83/402 |
| 3,083,809 A * | 4/1963 | Fischer | ............ | 198/443 |
| 3,874,519 A * | 4/1975 | Mikami | ............ | 414/15 |
| 4,292,864 A * | 10/1981 | Cucchi et al. | ............ | 82/126 |
| 4,628,779 A * | 12/1986 | Louis | ............ | 82/126 |
| 4,977,801 A * | 12/1990 | Fabbri | ............ | 82/127 |
| 5,115,702 A * | 5/1992 | Link | ............ | 82/126 |
| 5,911,804 A * | 6/1999 | Haller et al. | ............ | 82/127 |
| 6,182,543 B1 * | 2/2001 | Ito et al. | ............ | 82/127 |

FOREIGN PATENT DOCUMENTS

| | | | |
|---|---|---|---|
| DE | 1438409 | * | 9/1976 |
| DE | 2615548 A | * | 10/1977 |
| EP | 0344731 | | 12/1989 |
| EP | 1332814 A2 | * | 8/2003 |

(Continued)

*Primary Examiner* — Kenneth E. Peterson
*Assistant Examiner* — Jennifer Swinney
(74) *Attorney, Agent, or Firm* — Wood, Herron & Evans, LLP (57) ABSTRACT

An installation for sequential loading of bars of material in a machining center includes a frame, a first device, and a second device. The frame includes at least one first arcuate bearing surface and at least one second arcuate bearing surface connected to the first bearing surface at a first station. The first device includes a first elongated body having a peripheral first face engaging the at least one first bearing surface and a plurality of first longitudinal cavities in the first face. The first elongated body is configured to rotate such that the first bearing surface blocks an opening of the first longitudinal cavities between a first position where a bar is loaded into the first longitudinal cavity and a second position where a bar exits the first longitudinal cavity at the first station.

16 Claims, 6 Drawing Sheets

FOREIGN PATENT DOCUMENTS

| | | | |
|---|---|---|---|
| GB | 1438409 | | 6/1976 |
| JP | 59053102 A | * | 3/1984 |
| JP | 60067002 A | * | 4/1985 |
| JP | 62009802 A | * | 1/1987 |
| JP | 01115502 A | * | 5/1989 |
| JP | 05042441 A | * | 2/1993 |
| JP | 06226505 A | * | 8/1994 |
| JP | 06262402 A | * | 9/1994 |
| JP | 11320206 A | * | 11/1999 |
| JP | 2002036005 A | * | 2/2002 |

\* cited by examiner

INSTALLATION FOR SEQUENTIAL LOADING OF BARS OF MATERIAL INTO A MACHINING CENTER

The invention relates to an installation for sequential loading of bars of material into a center for machining these bars.

In the field of manufacturing by machine, it is known to produce pieces on automatic turning lathes starting with bars of material and to do this by proceeding with successive operations of machining of longitudinal portions of these bars.

The loading installations of the aforementioned type are known in this field by the name of bar feeders, and serve to feed such automatic turning machines used in industrial production.

The part of such a machining center which accepts a bar is generally, but not in a limiting way, a tubular rotary part referred to as spindle.

The installations for sequential loading of bars contain functional devices making it possible to ensure different operations which are in particular:

an operation combining the actions of support and guiding of a bar, in particular during its rotation, and this in the course of a displacement in translation of this bar along a guide axis, in particular substantially coaxially to the part of the machining center which must be passed through by said bar in order to be presented to a system of tools situated in this machine, an operation of storage of a plurality of bars, operations of selection and taking of a bar, operations of displacement in translation of the selected bar in a way so as to bring about selectively the displacement of this bar in such a way as to place it in a position referred to as ready to load, the pushing of the bar, sequentially, in particular through the machining center, from said position referred to as ready to load until a predetermined number of pieces have been achieved, the extraction from the machining center of a segment of bar which has not been used in this machining center, the displacement of said non-used segment of bar, commonly called scrap, to a final position such as that of a station for removal of this segment of bar.

The invention permits preferably, but not exclusively, the construction of installations for sequential loading of bars which are very flexible and which are thus difficult to manipulate when they are not grouped into bundles.

One of the results which the invention aims to obtain is an installation of the aforementioned type that permits separate bars to be manipulated, and operates reliably, taking into account the flexibility of each of these bars.

Another of the results which the invention aims to obtain is an installation of the aforementioned type which has a large reserve of bars with a view to ensuring long autonomy of operation for the machining center which it makes it possible to feed.

Still another result which the invention aims to obtain is the loading of the installation with concurrent operation time.

Other results will become evident upon reading of the description which follows, given by way of non-limiting example, with reference to the attached drawing representing schematically.

Referring to the drawing, seen is an installation for sequential loading 1 of bars of material, referred to as bars 2, in a machining center 4 for these bars 2.

In the following, the installation for sequential loading 1 of bars 2 is designated more simply by the term installation 1.

In a non-limiting way, one sees that the installation 1 permits the sequential loading 1 of bars 2 in a part 3 of the machining center 4.

The part 3 is a spindle, for example.

The machining center 4 for bars 2 is designated more simply by the term machining center 4, which machining center 4 is only indicated symbolically and will not be described in detail.

Figure 1:
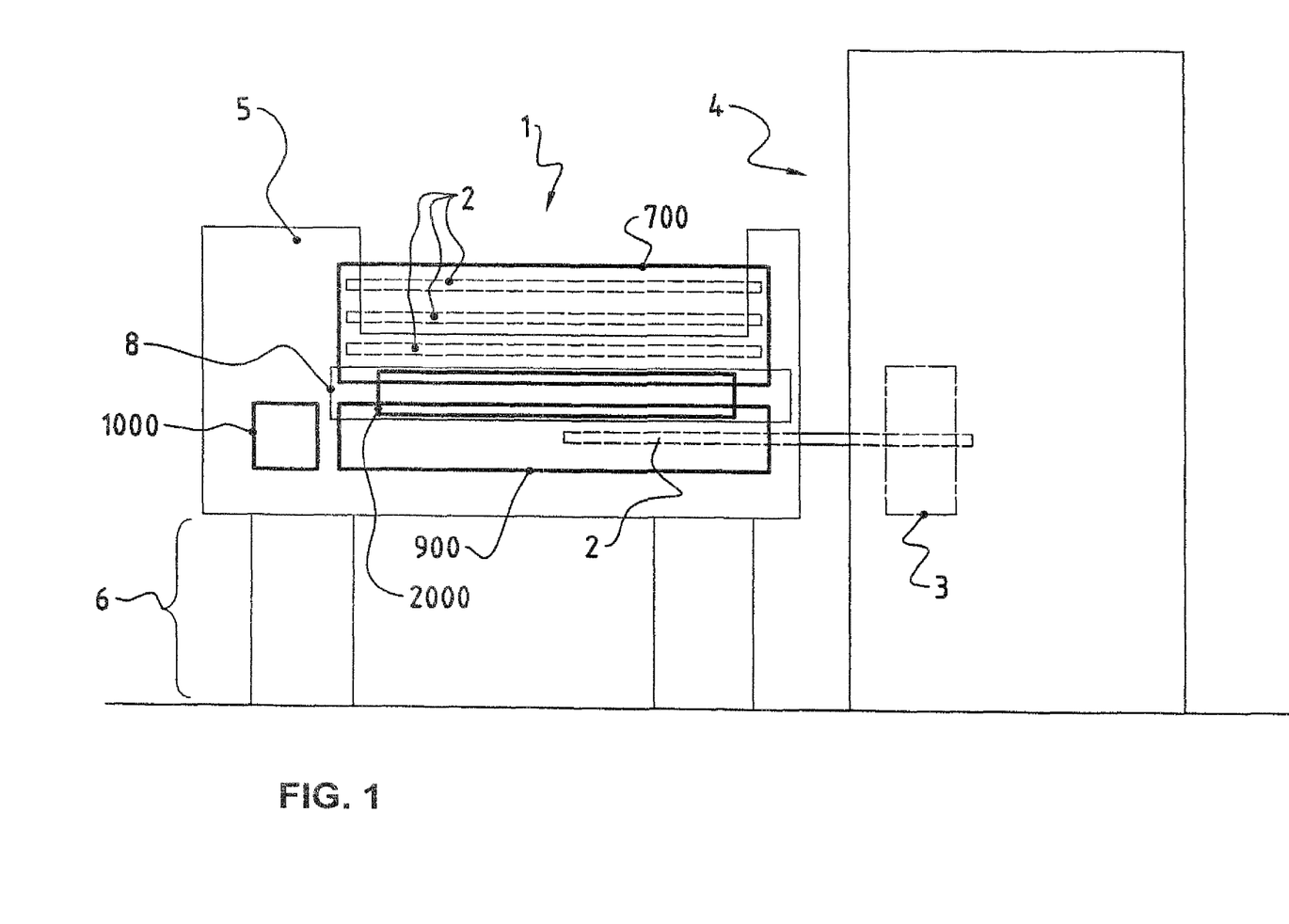
FIG. 1: seen laterally, an installation according to the invention and a machining center which is connected with this installation.
Figure 2:
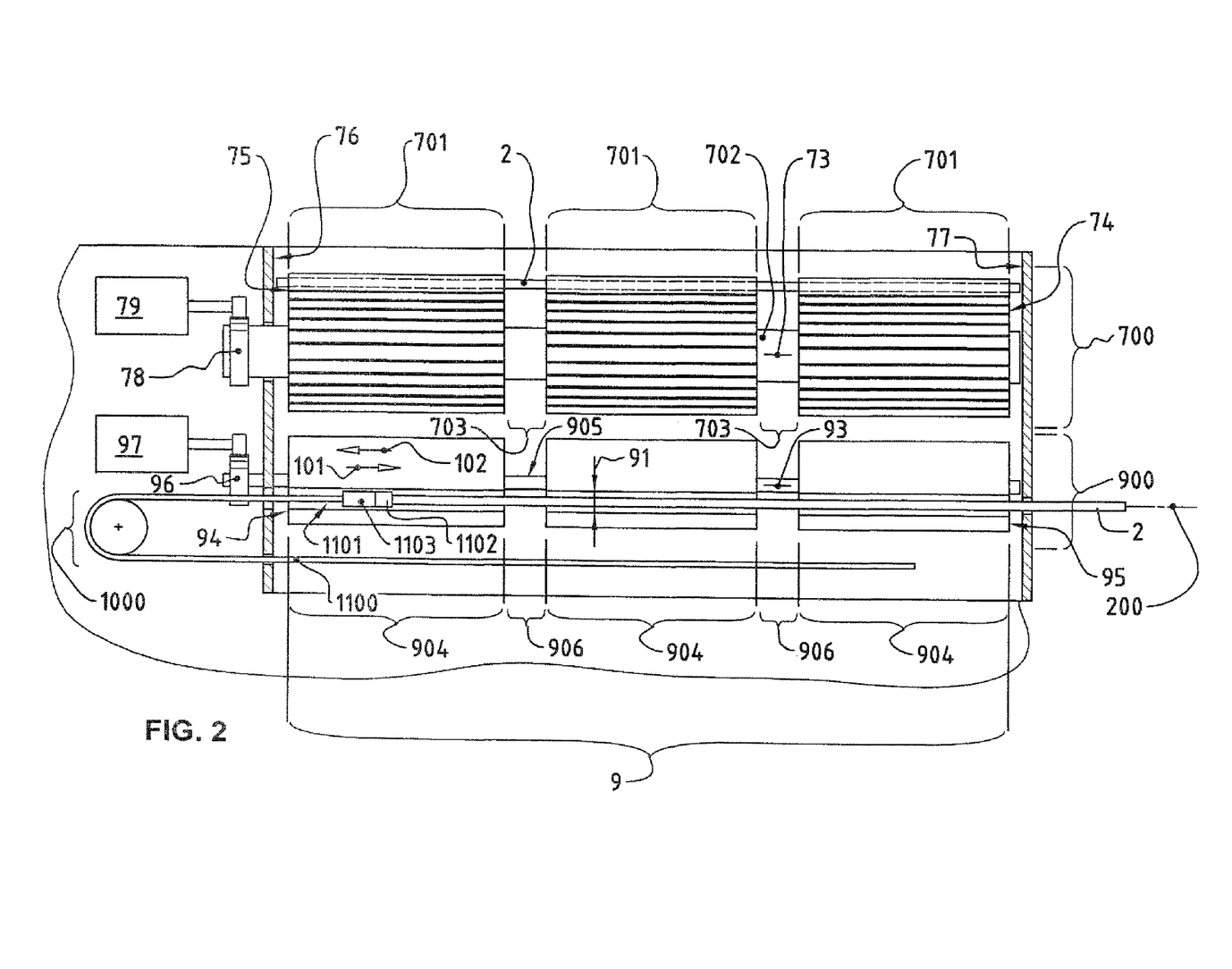
FIG. 2: a partial view and in longitudinal section of an installation according to the invention.
Figure 3:
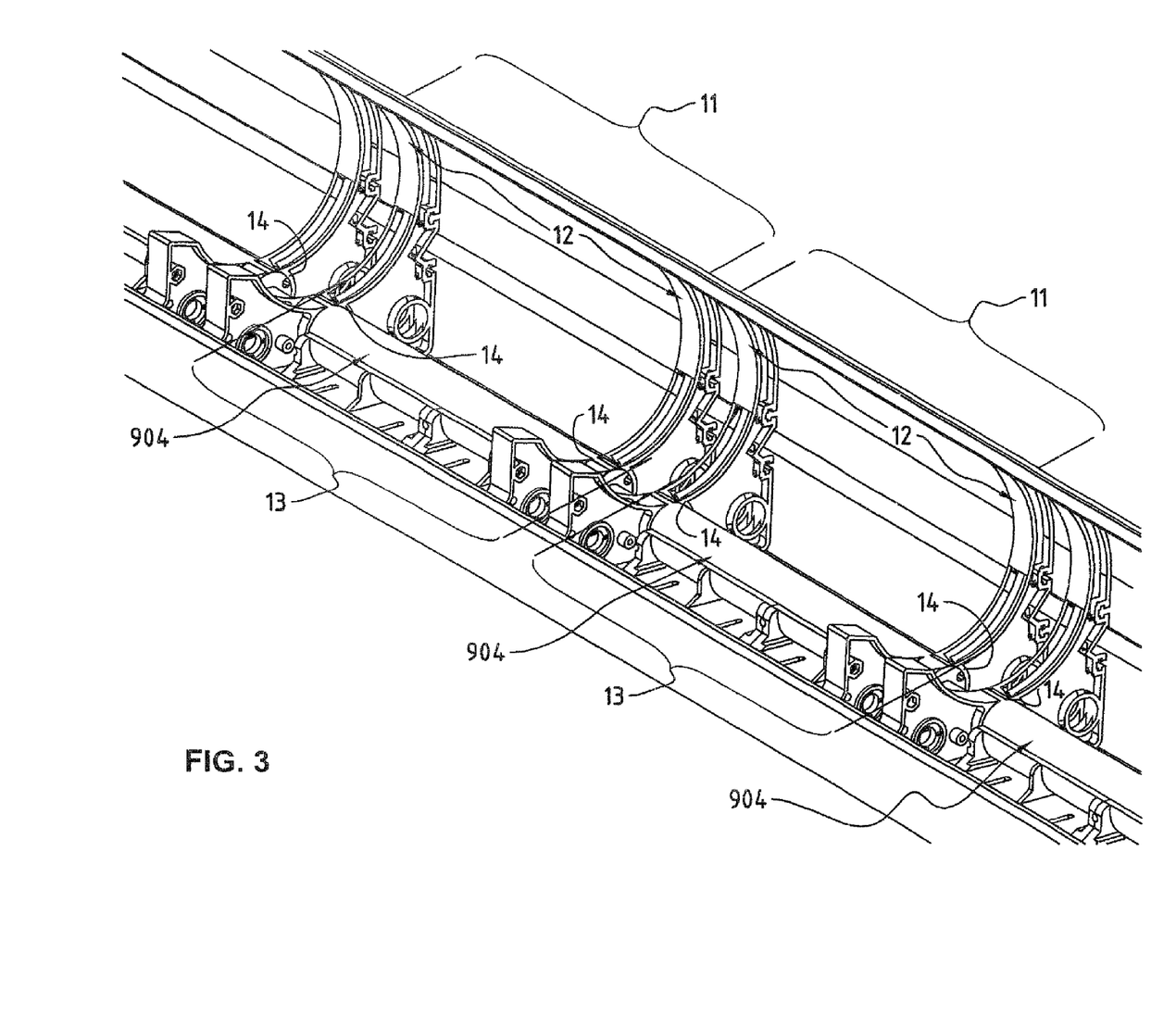
FIG. 3: a view in perspective of the installation of which one part (first body) has been set down.
Figure 4:
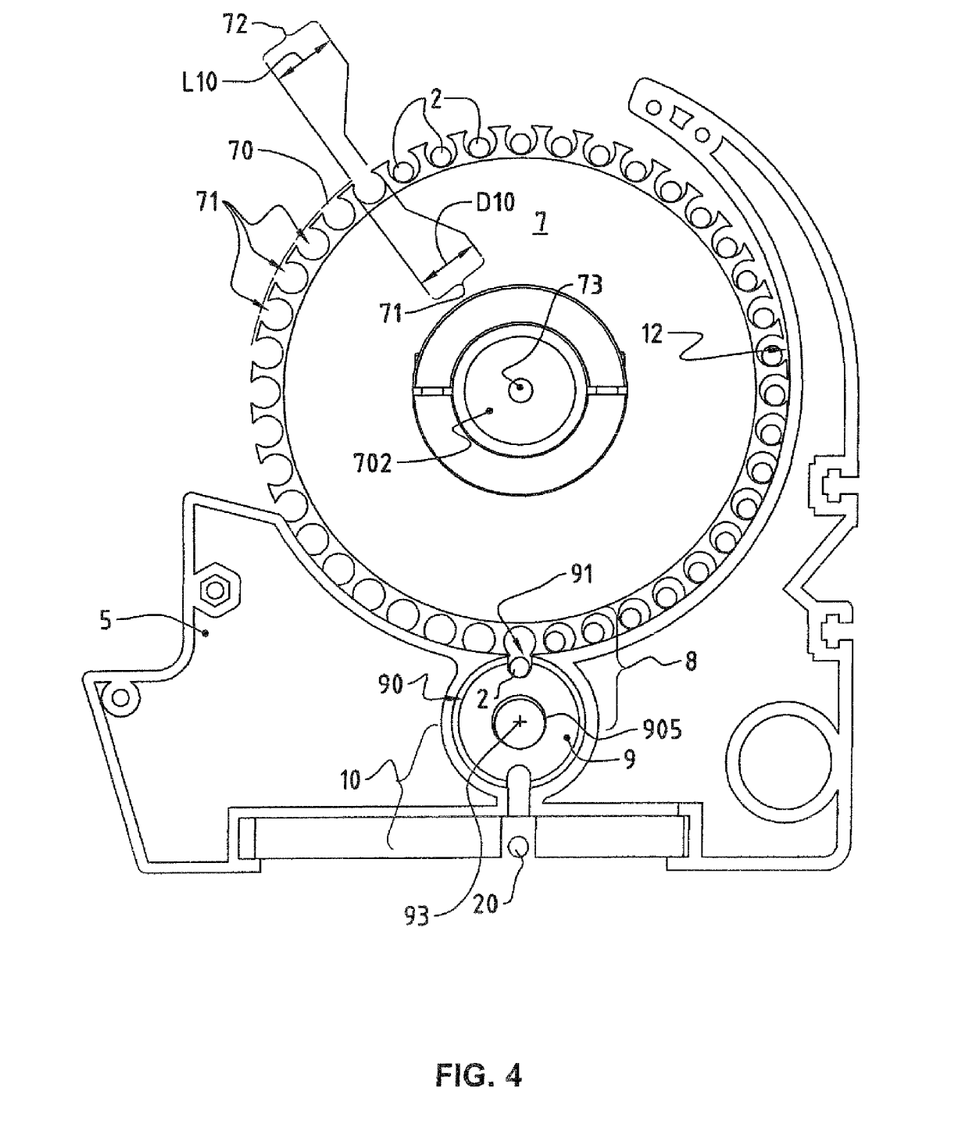
FIG. 4: the installation seen partially from one end.
Figure 5:
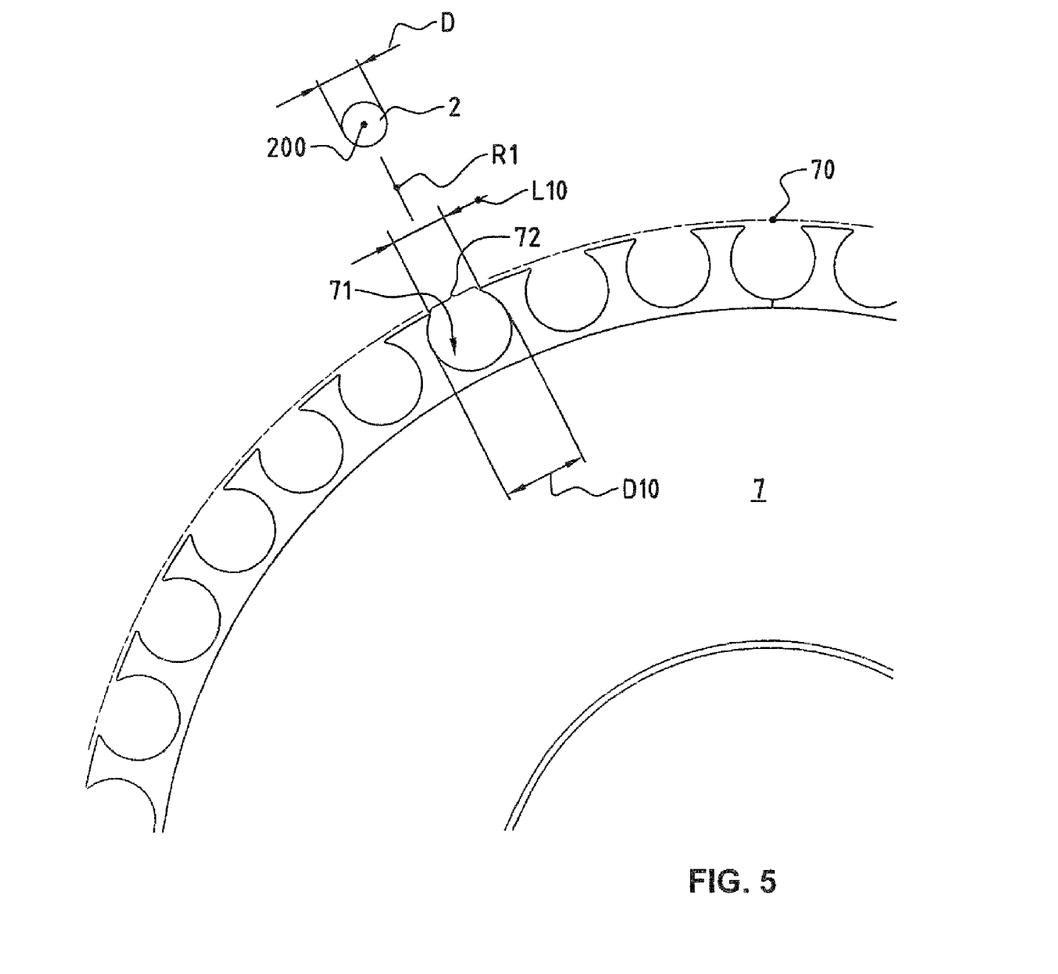
FIGS. 5 and 6: on a larger scale, two details of FIG. 4.
Figure 6:
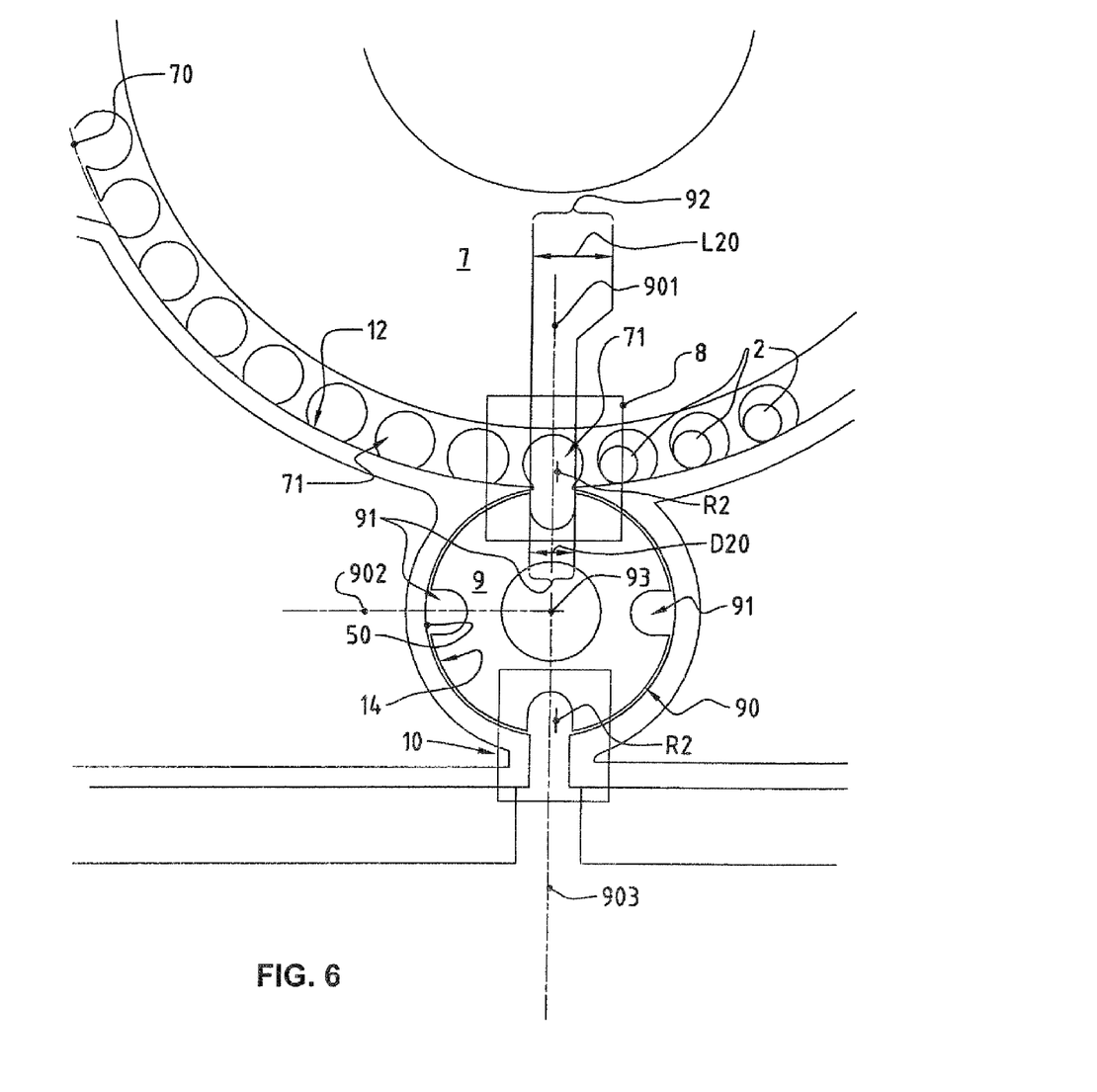

One sees that the installation 1 comprises a frame 5 which, like the machining center 4, rests on a support, in particular a substantially horizontal support, such as the ground (symbolized by a line in FIG. 1).

Preferably, the frame 5 of the installation 1 rests on the ground by means of an under frame 6 of the type adjustable in height, with a view to height adjustment of the installation with respect to the machine 4 and, in particular, with respect to the spindle 3 of this machine 4.

In a noteworthy way, the installation 1 is equipped:

with a first device 700 which is, on the one hand, constituted by a first elongated body 7, the volume of which is substantially determined by a peripheral surface, referred to as first face 70, and comprising a plurality of first longitudinal cavities 71 which are each able to accommodate a bar 2 and each include a first opening 72 made in said first face 70, on the other hand, is able to carry out a fractional rotation about a first axis 73, aligned longitudinally, particularly carrying bars 2, so as to present the first cavities 71 in sequence to at least one first station 8, with a second device 900 which is, on the one hand, constituted by a second elongated body 9, the volume of which is substantially determined by a peripheral face, referred to as the second face 90, and including at least one second longitudinal cavity 91 which is able to accommodate a bar 2, and comprises a second opening 92, made in said second face 90, on the other hand, is able to carry out a fractional rotation movement about a second axis 93, aligned longitudinally, and to do so between at least two angular positions which are a first angular position 901 in which the second cavity 91 is located opposite a first cavity 71 placed at the first station 8 and a second angular position 902 in which said second cavity 91 is radially closed off in such a way that the bar 2 it holds is guided in rotation and in translation along the longitudinal axis 200 it has.

In the drawings, the first face 70 has been symbolized by a broken line.

The second angular position 902 is a position in which the bar 2 is guided in rotation and in translation so as to be loaded into the spindle of a machining center 4 to which the installation 1 is connected.

This implies of course that the installation 1 and the machining center 4 have been suitably arranged beforehand, one with respect to the other.

It is seen later that there also exists a third angular position 903, but other positions can also exist.

The volume of the first body 7 is likewise determined by two opposite end faces referred to as third face 74 and fourth face 75.

In a noteworthy way, the first body 7 and the second body 9 are, at the level of the first station 8, substantially tangent along longitudinal generatrices.

The first body 7 thus ensures an operation of storage by acting as a rotary magazine.

The second body 9 ensures a double operation, i.e. an operation of selection of a bar 2 and an operation of guiding of the selected bar 2 in rotation and in translation.

In a noteworthy way:
each first cavity 71 has longitudinal and transverse dimensions which are adapted to permit the accommodation of a bar 2 of predetermined maximal longitudinal and transverse dimensions, and
the first opening 72 of each first cavity 71 has longitudinal and transverse dimensions which are adapted to permit equally the insertion of a bar 2 in the first cavity 71 and the extraction of a bar 2 from this first cavity 71, and this in a first direction R1 radial with respect to the first body 7.

In a first embodiment, the first body 7 comprises a first series of first cavities 71 which all have the same predetermined cross section to receive bars 2, the outer diameter D of which can range between two predetermined values.

Designated by outer diameter D is the diameter of a volume generated by rotation of the bar 2 about its longitudinal axis 200.

In fact, the bars 2 do not have a cross section limited to circular.

The bars 2 can have a square, hexagonal or other cross section.

In a second embodiment, the first body 7 comprises a plurality of series of first cavities 71 which have different cross sections, for example, two series of first cavities 71 of two different cross sections.

This allows construction of a first body adapted to contain a greater variety of diameters of bars 2.

Whatever the case may be, the first body 7 thus comprises at least a first series of first cavities 71 which all have the same predetermined cross section to receive bars 2 of which the outer diameter D can range between two predetermined values.

When said third face 74 and fourth face 75 of the first body 7 comprise orifices formed by the ends of the first cavities 71, said third face 74 and said fourth face 75 are each situated facing a wall, referred to as first wall 76 and second wall 77, which oppose a possible axial ejection of a bar 2.

Thus no axial ejection can disturb the functioning of the installation 1, in particular the rotation of said first body 7.

In a way also noteworthy:
each second cavity 91 has longitudinal and transverse dimensions which are adapted to permit the accommodation of a bar 2 of predetermined maximal longitudinal and transverse dimensions, and
the second opening 92 of each second cavity 91 has longitudinal and transverse dimensions which are adapted to permit equally the insertion of a bar 2 in the second cavity 91 and the extraction of a bar 2 from the second cavity 91, and this in a second direction R2 radial with respect to the second body 9.

The volume of the second body 9 is likewise determined by two opposite end faces referred to as fifth face 94 and sixth face 95.

In a first embodiment, the second body 9 comprises a second cavity 91 of predetermined cross section to accept bars 2 of which the outer diameter D can range between two predetermined values.

In a second embodiment, the second body 9 comprises a plurality of second cavities 91 which have different cross sections, for example two second cavities 91 of two different cross sections.

For example, the second body 9 comprises at least:
a second cavity 91, the cross section of which is adapted to receive bars 2 whose outer diameter D is within a first predetermined interval, and
another second cavity 91, the cross section of which is adapted to receive bars 2 whose outer diameter D is within a second predetermined interval different from the first predetermined interval.

This permits construction of a second body adapted to receive and above all guide a greater variety of diameters of bars 2.

However, when the second body 9 comprises a plurality of second cavities 91 which have different cross sections, for example two second cavities 91 of two different cross sections, this does not necessarily imply that the first body also comprises a plurality of series of first cavities 71 which have different cross sections, for example two series of first cavities 71 of two different cross sections.

In other terms, when the second body 9 comprises a plurality of second cavities 91 which have different cross sections, for example two second cavities 91 of two different cross sections, the first body can only contain a single series of first cavities 71.

Preferably, the second body 9 comprises at least:
a first set of two second cavities 91 whose cross section is adapted to accept bars 2 whose outer diameter D is within a first predetermined interval, and the two second cavities of this first set have diametrically opposite positions on the second body 9,
a second set of two other second cavities 91 whose cross section is adapted to receive bars 2 whose outer diameter D is within a second predetermined interval, different from the first predetermined interval, and the two second cavities of this second set likewise have diametrically opposite positions on the second body 9.

The installation 1 is equipped with a third device 1000 which co-operates with the second device 900 and is able to ensure the displacement in translation of the bar 2 contained in the second cavity 917 and this
in a first direction 101 corresponding to a direction of insertion of the bar 2 in a machining center 4 and
in a second direction 102, opposite to the first direction 101, with a view to withdrawing from the machine tool 4 a segment 20 of the bar 2 which has not been used and of putting this segment back in the second cavity 91 which contained the bar 2 from which this segment 20 originated.

Preferably this third device 1000 is of known type, implementing a flexible element 1100 which can extend substantially parallel to the second body 9 and:
can be inserted, by one of the end parts 1101, into the second cavity 91, in the first direction 101, in such a way as to act on a bar 2 which is found placed there in order to push it axially and progressively inside said second cavity 91, and
can be extracted axially from said second cavity 91, in the second direction 102, in particular in such a way as to extract the remaining segment of bar 2, and, for example, to be put back again substantially parallel to the second body 9.

The one of the end parts 1101 of the flexible element 1100 which is inserted into the second cavity 91 is provided with an element for gripping 1102 an end of the bar 2.

The gripping element 1102 is mounted on the corresponding end part 1101 of the flexible element 1100 by means of at least one element known by the name of turning attachment 1103.

The third device 1000 is not described in detail because it is known per se.

The second body 9 of the second device 900 is able to carry out a movement of fractional rotation toward a third angular position 903 in which each second cavity 91 is presented to a removal station, referred to as second station 10, at the level of which the segment 20 can be removed from the second cavity 91.

Each first cavity 71 has a first opening 72, which is of first width L10, greater than the outer diameter D of the bar 2 which must be inserted into this first cavity 717 and said first cavity 71 has a cross section determined by a first inner surface of substantially C-shaped contour, in which a first diametral dimension D10 is inscribed which is greater than the first width L10 of said first opening 72.

Each second cavity 91 has a second opening 92 which is of second width L20 greater than the outer diameter D of the bar 2 which must be inserted into this second cavity 91, and said second cavity 91 has a cross section determined by a second inner surface of substantially U-shaped contour, in which a second diametral dimension D20 is inscribed substantially equal to the second width L20 of said second opening 92.

In the second angular position 902, the second cavity 91 is placed facing a third surface 50 which closes it in such a way that a bar 2 placed in this second cavity 91 can be guided in rotation and in translation along the longitudinal axis 200 which it has.

Represented in the drawing is the second angular position offset by ninety degrees with respect to the first angular position, but it is only an example.

The third surface 50 is preferably constituted by a portion of a face of a bore provided in the frame 5 of the installation to receive the second body 9.

The first body 7 is equipped with a first element 78 for receiving a rotation movement imparted by a first controlled motor device 79, in particular integral with the frame 5.

Preferably, the first element 78 for receiving a rotation movement preferably consists of a toothed wheel which meshes with a pinion driven in rotation by the first motor device 79.

The second body 9 is equipped with a second element 96 for receiving a rotation movement imparted by a second controlled motor device 97, in particular integral with the frame 5.

Preferably, the second element 96 for receiving a rotation movement preferably consists of a toothed wheel which meshes with a pinion driven in rotation by the second motor device 97.

The first motor device 79 and the second motor device 97 preferably consist of electric geared motors which are controlled by a programmable control unit (not shown).

As the case may be, the rotation of the first body 7 can be controlled separately from the rotation of that of the second body 9, in such a way that bars 2 can be loaded into the first body 7, for example, while a bar 2 is guided in rotation and in translation in a second cavity 91 of the second body 9.

The first body 7 is constituted by assembly of at least one first section 701 on a first shaft 702.

Preferably, the first body 7 is constituted by assembly of a plurality of first substantially identical sections 701 on a first shaft 702.

This technical particularity permits construction of installations 1, the length of the first body 7 of which can be adjusted.

This allows creation of installations 1 of different lengths, and makes it possible to respond more easily to different requirements with respect to the length of said installations 1 and/or the length of the bars 2 to be machined.

For example each first section 701 has a length of approximately five hundred millimeters.

For example, each first section 701 is formed by assembly of four sectors of cylindrical walls on two circular flanges.

Each sector of cylindrical wall consists of a piece whose cross section is contoured to bear a plurality of first cavities 71.

The flanges each comprise an axial bore allowing the passage of the first shaft 702, the centering and the immobilization on said first shaft 702.

These details of construction are not shown.

The installation 1 comprises at least one first group 11 of two first bearing surfaces 12 which, each intended to cooperate with the first face 70 of the first body 7 on a predetermined portion of its longitudinal dimension,
 are separated by a predetermined distance to define a substantially horizontal cylindrical support,
 each extend on at least a first angular portion of the predetermined first face 70 to
  ensure a cylindrical support for the first body 7,
  permit the radial access to at least one first cavity 71 with a view to loading of a bar 2,
  prevent the fall of bars 2 outside each first cavity 71 containing the bar, during the rotation of said first body 7 with a view to presenting in sequence each first cavity 71 in front of at least a first station 8,
  permit the extraction of a bar 2 from said first station 8.

The installation 1 comprises as many first groups 11 of first bearing surfaces 12 as it comprises first sections 701.

The second body 9 is also constituted by assembly of at least one second section 904 on a second shaft 905.

Preferably, the second body 9 is formed by assembly of a plurality of substantially identical second sections 904 on a second shaft 905.

The installation 1 comprises at least one second group 13 of two second bearing surfaces 14 which, each intended to cooperate with the second face 90 of the second body 9 on a predetermined portion of its longitudinal dimension,
 are separated by a predetermined distance to define a substantially horizontal cylindrical support,
 each extend on at least a second angular portion of the predetermined second face 90 to
  ensure a cylindrical support for the second body 9 at least between the angular positions 901, 902, 903, referred to as first, second and third, in such a way as to
  in the first angular position 901, permit radial access to at least one second cavity 91 with a view to loading of a bar 2 into the second cavity 91 when it is situated vis-à-vis a first cavity 71 placed at the first station 8,
  impede the fall of the bar 2 during the rotation of said second body 9 toward the second angular position 902,
  participate in the guiding in rotation and in translation of the bar 2 when the second body 9 is placed in the second angular position 902, impede the fall of a segment 20 of bar 2 during the rotation of said second body 9 toward the third angular position 903, and permit its fall when said third angular position 903 is reached.

The installation 1 comprises as many second groups 13 of second bearing surfaces 14 as it comprises second sections 904.

Preferably, the first body 7 has a first axis 73 which is substantially horizontal, and the first station 8 is situated plumb with a lower longitudinal generatrix of said first body 7, the second body 9 has a second axis 93 which is substantially horizontal, and is situated under the level of the first body 7 and in a vertical plane which passes through the first axis 73 of the first body 7, the first angular position 901 of the second body 9 corresponds to the situation in which the second cavity 91 is placed facing a first cavity 71 presented to the first station 8, the third angular position 903 of the second body 9 corresponds to the situation in which the second opening 92 of a second cavity 91 which contains a segment 20 is presented to the second station 10, and this third angular position 903 is offset by approximately one hundred eighty degrees with respect to the first angular position 901, in such a way that the segment 20 can be removed by gravity, the second angular position 902 of the second body 9 is between the first angular position 901 and the third angular position 903.

In general, each bar 2 placed at the first station 8 can, owing to gravity, exit the first cavity 71 which contains it to descend into a second cavity 91.

However, in a noteworthy way, the first station 8 comprises a fourth device 2000 to assist in the transfer of a bar 2 situated in a first cavity 71 of the first body 7 towards a second cavity 91 of the second body 9.

This fourth device 2000 makes it possible to ensure the descent of any bar 2 which, owing to a certain curvature, would be held back in a first cavity 71.

In a noteworthy way:

the first sections 701 assembled on the first shaft 702 with a view to constituting the first body 7 are spaced axially, in pairs, by a first predetermined value in such a way as to define a first clearance 703, the second sections 904 assembled on the second shaft 905 with a view to constituting the second body 9 are spaced axially, in pairs, by a second predetermined value, in such a way as to define a second clearance 906, the fourth device 2000 for the transfer of a bar 2, situated in a first cavity 71 of the first body 7, towards a second cavity 91 of the second body 9 comprises elements which are disposed to be active in said first clearance 703 and second clearance 906.

The construction in sections is thus perfectly used to best advantage to accommodate at least certain constituent elements of the fourth device 2000.

The invention claimed is:

1. An installation for sequential loading of bars of material in a machining center, the installation comprising:

a frame including at least one first arcuate bearing surface and at least one second arcuate bearing surface, the first and second arcuate bearing surfaces connected at a first station;

a first device including a first elongated body having a longitudinal axis, a peripheral first face engaging the at least one first arcuate bearing surface, and a plurality of first longitudinal cavities, each first longitudinal cavity sized to accommodate a bar and including a first opening made in said first face, the first device being rotatable about its longitudinal axis such that each first longitudinal cavity moves from a first position for receiving a bar to a second position at the first station, the at least one first arcuate bearing surface occluding each first opening between the first position and the second position such that the bar in each first longitudinal cavity is delivered to the first station;

a second device including a second elongated body having a longitudinal axis, a peripheral second face engaging the at least one second arcuate bearing surface, and at least one second longitudinal cavity sized to accommodate a bar and including a second opening made in said second face, the second device being rotatable about its longitudinal axis such that each second longitudinal cavity moves from a first position at the first station for receiving a bar from a first longitudinal cavity of the first elongated body, to a second position in which the at least one second arcuate bearing surface occludes the second opening such that the bar is guided in rotation and in translation; and a third device operable to translate a bar contained in the second cavity along first and second opposite directions, the first direction corresponding to a direction of insertion of the bar in a machining center and the second direction enabling withdrawal from the machine tool a segment of the bar which has not been used by the machining center.

2. The installation according to claim 1, wherein each bar of material has predetermined maximal longitudinal and transverse dimensions, and the first opening of each first longitudinal cavity has longitudinal and transverse dimensions which are adapted to permit the insertion of a bar in the first cavity and the extraction of a bar from this first cavity.

3. The installation according to claim 1, wherein each bar of material has predetermined maximal longitudinal and transverse dimensions, and the second opening of each second longitudinal cavity has longitudinal and transverse dimensions which are adapted to permit the insertion of a bar in the second cavity and the extraction of a bar from the second cavity.

4. The installation according to claim 1, wherein the second device is further rotatable about its longitudinal axis such that each second longitudinal cavity moves from the second position to a third position in which the at least one second arcuate bearing surface no longer occludes the second opening, such that each second longitudinal cavity is presented to a second station at which the segment can be removed from the second longitudinal cavity.

5. The installation according to claim 1, wherein each bar defines a maximum bar diameter, each first opening has a first width greater than the maximum bar diameter, and each first longitudinal cavity has a C-shaped cross section having a first diametric dimension greater than the first width.

6. The installation according to claim 1, wherein each bar defines a maximum bar diameter, each second opening has a second width greater than the maximum bar diameter, and each second longitudinal cavity has a U-shaped cross section having a second diametric dimension substantially equal to the second width.

7. The installation according to claim 1, wherein the at least one first bearing surface includes two first bearing surfaces that are separated by a predetermined distance in order to define a substantially horizontal cylindrical support for the first body.

8. The installation according to claim 1, wherein the first body is constituted by assembly of at least one first section on a first shaft.

9. The installation according to claim 8, further comprising at least as many first bearing surfaces as first sections.

10. The installation according to claim 1, wherein the at least one second bearing surface includes two second bearing surfaces that are separated by a predetermined distance to define a substantially horizontal cylindrical support for the second body.

11. The installation according to claim 1, wherein the second body is constituted by assembly of at least one second section on a second shaft.

12. The installation according to claim 11, further comprising at least as many second bearing surfaces as second sections.

13. The installation according to claim 1, wherein the longitudinal axes of the first and second elongate bodies are substantially horizontal, and the first and second positions of the first longitudinal cavities are separated by 180 degrees of rotation of the first device, and the first and third positions of the second longitudinal cavities are separated by 180 degrees of rotation of the second device.

14. The installation according to claim 1, wherein the first body comprises a plurality of series of first cavities which have different cross sections.

15. The installation according to claim 1, wherein the second body comprises a plurality of second cavities which have different cross sections.

16. The installation according to claim 1, wherein the first body and the second body are substantially tangent along longitudinal generatrices at the first station.

* * * * *